(12) United States Patent
den Hartogh et al.

(10) Patent No.: US 12,044,405 B2
(45) Date of Patent: *Jul. 23, 2024

(54) BURNER COVER INSULATION DEVICE FOR A BOILER AND METHOD FOR MANUFACTURING SUCH A DEVICE

(71) Applicant: Industrial Ceramic Linings B.V., Rotterdam (NL)

(72) Inventors: Ike den Hartogh, Rotterdam (NL); Remco Tournier, Rotterdam (NL); Eric Tournier, Rotterdam (NL)

(73) Assignee: Industrial Ceramic Linings B.V., Rotterdam (NL)

( * ) Notice: Subject to any disclaimer, the term of this patent is extended or adjusted under 35 U.S.C. 154(b) by 498 days.

This patent is subject to a terminal disclaimer.

(21) Appl. No.: 17/220,039

(22) Filed: Apr. 1, 2021

(65) Prior Publication Data

US 2021/0215338 A1    Jul. 15, 2021

Related U.S. Application Data (62) Division of application No. 14/925,532, filed on Oct. 28, 2015, now Pat. No. 10,995,953.

(30) Foreign Application Priority Data

Oct. 28, 2014  (NL) .................................... 2013697
Oct. 27, 2015  (NL) .................................... 2015669

(51) Int. Cl.
*F23J 13/04*  (2006.01)
*B23P 19/00*  (2006.01)
*F23M 7/00*  (2006.01)

(52) U.S. Cl.
CPC .............. *F23J 13/04* (2013.01); *B23P 19/00* (2013.01); *F23M 7/00* (2013.01); *F23J 2213/203* (2013.01)

(58) Field of Classification Search
CPC ....... B23P 19/00; F23J 13/04; F23J 2213/203; F23M 7/00
See application file for complete search history.

(56) References Cited

U.S. PATENT DOCUMENTS 668,684  A  *  2/1901  Kelly ...................... D04H 1/52
                                                             112/420
1,864,333  A  *  6/1932  Aldrich .................... F23M 7/00
                                                             126/190

(Continued)

FOREIGN PATENT DOCUMENTS

CH           494372  A       7/1970
CH           496929  A       9/1970

(Continued)

*Primary Examiner* — Jorge A Pereiro
*Assistant Examiner* — Logan P Jones
(74) *Attorney, Agent, or Firm* — N.V. Nederlandsch Octrooibureau (57) ABSTRACT

The invention relates to a burner cover insulation device for shielding a burner cover from a boiler burner, the device comprising a cover layer comprising a heat resistant inorganic fibrous material and having a first outer peripheral edge; a support layer providing mechanical strength to the device and having a second outer peripheral edge that at least extends to the outer peripheral edge of the cover layer; and a filling material forming an insulating layer between the cover layer and the support layer, wherein a through hole extends through the cover layer and the support layer. The invention furthermore relates to a method for manufacturing such a device.

17 Claims, 6 Drawing Sheets

(56) References Cited

U.S. PATENT DOCUMENTS

| | | | |
|---|---|---|---|
| 4,204,856 A | 5/1980 | Yigdall et al. | |
| 4,255,502 A | 3/1981 | Taylor, III | |
| 4,577,839 A * | 3/1986 | Carlson | F27D 1/0009 |
| | | | 266/280 |
| 4,847,140 A | 7/1989 | Jaskowski | |
| 5,113,532 A * | 5/1992 | Sutton | A41D 31/24 |
| | | | 2/48 |
| 5,304,408 A | 4/1994 | Jarosz et al. | |
| 5,449,287 A * | 9/1995 | Simko | F23M 5/025 |
| | | | 52/270 |
| 5,626,951 A * | 5/1997 | Hogenson | B32B 5/26 |
| | | | 428/920 |
| 5,811,168 A * | 9/1998 | Rasky | B32B 15/14 |
| | | | 442/247 |
| 2003/0106668 A1* | 6/2003 | Cowie | E06B 1/62 |
| | | | 165/10 |
| 2010/0101509 A1 | 4/2010 | Tanbour et al. | |
| 2012/0198784 A1 | 8/2012 | Shaw | |
| 2014/0238648 A1* | 8/2014 | Lehr | B32B 15/18 |
| | | | 165/135 |

FOREIGN PATENT DOCUMENTS

| | | | | |
|---|---|---|---|---|
| DE | 821387 C | 11/1951 | | |
| DE | 6922968 U | 4/1970 | | |
| DE | 2440700 A1 | 3/1976 | | |
| DE | 4016880 A1 | 11/1991 | | |
| DE | 9405737 U1 | 6/1994 | | |
| DE | 10163590 A1 | 7/2003 | | |
| FR | 2669410 A3 * | 5/1992 | | F23M 7/00 |
| GB | 2482321 A * | 2/2012 | | A47J 36/36 |
| JP | 08028777 A | 2/1996 | | |

* cited by examiner

BURNER COVER INSULATION DEVICE FOR A BOILER AND METHOD FOR MANUFACTURING SUCH A DEVICE

CROSS-REFERENCE TO RELATED APPLICATIONS

This application is a divisional of U.S. application Ser. No. 14/925,532 filed on Oct. 28, 2015, which claims priority to and the benefit of the Netherlands Patent Application No. 2013697, filed Oct. 28, 2014, and of the Netherlands Patent Application No. 2015669, filed Oct. 27, 2015. All three applications are hereby incorporated by reference in their entireties.

TECHNICAL FIELD

The present invention relates to a burner cover insulation device for protecting a burner cover in a boiler, in particularly a device suitable for damp environments combined with high temperatures, and a method for manufacturing such a device.

BACKGROUND ART

In a conventional boiler, fuel, such as gas or oil, is burned and the hot gasses produced are passed through a heat exchanger, usually in a housing, where much of the heat of the hot gasses is transferred to a heat transfer medium such as water, thus raising the medium's temperature.

One of the hot gasses produced in the combustion process is water vapor (steam), which arises from burning the hydrogen content of the fuel. A condensing boiler extracts additional heat from these waste gasses by condensing the water vapor to liquid water, thus recovering its latent heat of vaporization. A typical increase of efficiency can be as much as 10-12% compared to a non-condensing boiler. Thus, the choice of materials used in the areas where liquid is present have to be suitable. At high temperatures, the most commonly used materials are aluminum alloys and stainless steel alloys.

Condensing boilers are provided with a heat exchanger and a burner to heat the water or other heat transfer medium in the heat exchanger. The temperatures associated with heating the medium are usually above 500° C. or even above 1000° C. To protect the parts of the boiler that are not water cooled, or are outside the heat exchanger, and to prevent any flue gasses to escape the heat exchanger, the boiler is provided with a sealing gasket to prevent any hot gasses to escape the burner and/or heat exchanger housing and direct them towards a flue, and an insulating part in the shape of a burner stone to shield the cover plate of the boiler from the high temperatures in an interior of the burner and/or heat exchanger housing. In addition to the high temperatures, the condensate produced is slightly acidic, 3-5 pH.

The sealing gasket seals the periphery of the cover plate from the heat exchanger housing. The burner stone is usually made of molded granular vermiculite with a binder or bio soluble inorganic fibers in a binder.

A disadvantage of the used sealing gasket and the burner stones is that they have a relatively high failure rate in the harsh environment of the heat exchanger housing.

A first disadvantage of the burner stone is that it is fragile to begin with. The burner stone is easily damaged during transport and handling. Secondly, the binder of both burner stones is burnt out of the stones upon first use of the burner stones in the boiler due to the high temperatures, thereby weakening the structure of the burner stones.

In addition, the vermiculite burner stone is not suitable for withstanding thermal shock that is characteristic for modulating condensing boilers. In these condensing boilers, the temperature can shift between relatively low temperatures of below 300° C. to relatively high temperatures to 1000° C. The thermal shock results in failure of the vermiculite burner stone, such as cracks, flaking and complete failure of the stone, resulting in reduced protection of the cover plate and potential failure of the sealing gasket.

The inorganic fiber burner stone comprises inorganic high temperature resistant fibers that are bio- or body soluble, i.e. soluble in the human body. Thus they are also soluble in water, which is contained in the condensate produced in the burner. Upon use of the inorganic fiber burner stone, it will come into contact with the condensate and will bit by bit dissolve. The result is failure of the inorganic burner stone, similar to the vermiculite burner stone. In the past, other inorganic fibers than bio- or body soluble inorganic fibers were used, but these inorganic fibers are nowadays used less and less due to potential health risk, i.e. potential carcinogenic properties.

The sealing gasket itself is not capable of withstanding the high temperatures in the heat exchanger and is also protected by the burner stone. During use and particularly upon failure of the burner stone, the quality of the sealing gasket deteriorates quickly, thereby reducing the sealing ability of the sealing gasket.

It would be desirable to provide a burner cover insulation device and a sealing gasket capable of withstanding the harsh environment within the condensing boiler thereby overcoming the disadvantages of the known device.

SUMMARY OF THE INVENTION

According to the invention, there is provided a burner cover insulation device for shielding a burner cover from a boiler burner, comprising:
  a cover layer comprising a heat resistant inorganic fibrous material and having a first outer peripheral edge,
  a support layer providing mechanical strength to the device and having a second outer peripheral edge that at least extends to the outer peripheral edge of the cover layer, and
  a filling material forming an insulating layer between the cover layer and the support layer, wherein a through hole extends through the cover layer and the support layer thereby forming a first inner peripheral edge of the cover layer and a second inner peripheral edge of the support layer, wherein the through hole is at least delimited by the first inner peripheral edge of the cover layer, and wherein the cover layer and the support layer are connected along at least part of the first outer peripheral edge of the cover layer and at least part of the second inner peripheral edge of the support layer.

The burner cover insulation device comprises a cover layer comprising a heat resistant inorganic fibrous material, which has the function to protect the filling material from the heat produced by a burner in the boiler. Preferably, the heat resistant inorganic fibrous material of the cover layer comprises a heat resistant inorganic textile material, such as a woven or non-woven inorganic fiber textile, such as a woven mineral or glass fiber textile, preferably from a silica fiber. The inorganic fibrous textile may be coated with a heat resistant inorganic material, for example a mineral coating, such as a vermiculite coating, on at least a side facing away from the filling material.

A second component is a support layer that gives support to the cover layer and gives strength to the burner cover insulation device. Additionally, the support layer may provide thermal insulation for temperatures up to around 700 degrees Celsius, for example around 200-300 degrees Celsius. The support layer can furthermore comprise a fibrous inorganic material, preferably an inorganic fiber paper or textile, such as a mineral or glass fiber paper or textile. In this context, paper may include a felt made from an inorganic fiber wool.

In between the support layer and the cover layer at least one layer of filling material is provided. The filling material serves as an insulating layer and may be used to define the thickness and the shape of the burner cover insulation device.

The through hole extends through the cover layer and the support layer, such that in use a burner of a boiler can be received, i.e. the boiler burner can be put through the through hole. Alternatively, the through hole can provide an opening to the burner for receipt of other burner elements, such as burner fuel, for example a gas/air mixture. The through hole is delimited by at least the first inner peripheral edge of the cover layer. In another embodiment, the through hole may additionally be delimited by a third inner peripheral edge of the layer of filling material.

The cover layer and the support layer are connected along at least part of the outer peripheral edge of the cover layer and the inner peripheral edge of the support layer. The through hole may be delimited by the first and second inner peripheral edges of the cover layer and the support layer, respectively, and the cover layer and the support layer may be connected along at least part of the first and second inner peripheral edges. The first and second inner peripheral edges thus coincide. It may be that along the first and/or second inner peripheral edges and/or the first outer peripheral edge of the cover layer an unconnected portion is provided, for instance for further processing of the burner cover insulation device. Moreover, the cover layer and the support layer may be connected along the full first and/or second inner peripheral edges and/or along the full outer peripheral edge of the cover layer.

In use, the burner cover insulation device thermally insulates a housing that houses both the burner and a heat exchanger of the boiler, from a burner cover plate and a remainder of the boiler. The burner cover plate is protected from the heat in the housing by the device. Using a heat resistant fibrous inorganic material, such as a high temperature resistant, inorganic (mineral or ceramic) textile, enhances the mechanical strength and integrity of the burner cover insulation device during use. The fibers of the heat resistant material can be bonded together by weaving, braiding, crocheting, knotting or knitting, or by pressing the fibers together to form a non-woven textile, i.e. a felt. As the fibers of the fibrous material are mechanically bonded, a binder may not be necessary to bind them together. However, a binder may be used during manufacturing and processing of the fibrous material. This binder material may be removed from the fibrous material, for example being burnt away upon first use of the burner cover insulation device within the boiler. The integrity of the mechanical bond is thus maintained during use as any binder may be omitted or may be burnt away upon first use. Additionally, thermal shock resistance is increased by the use of a fibrous material. The enhanced mechanical bonding and the increased thermal shock resistance ensure that failure through fracturing, cracking or flaking is prevented, increasing the life time of the burner cover insulation device and thereby reducing maintenance costs of the boiler. Another advantage of using a mechanically bonded heat resistant fibrous inorganic material is the durability of the device during transport and handling. This durability is especially advantageous upon placing a device according to the invention into an existing boiler. The durability decreases the chance of any debris coming off the device, the debris contaminating the heat exchanger and the burner.

The cover layer functions as a heat resistant shield to shield the heat from the device, for instance by reflecting part of the heat from the boiler burner into the burner housing towards the heat exchanger. Heat that is not reflected by the cover layer is absorbed by the filling material that functions as a thermal insulator for the burner cover insulation device. The support layer provides increased mechanical strength to the device and supports both the relatively flexible cover layer and filling material, while keeping the device relatively flexible in its totality.

The device may comprise a further through hole, preferably at a distance different from zero from the through hole. In use, such a further through hole can function as a look-through to the looking glass of the boiler, or as an access point to an ignition pen or any other boiler utility. Such a further through hole will not necessarily be centered with respect to the center of the cover layer and the support layer and can be aligned with any utility in the boiler. The cover layer and the support layer may define a further inner peripheral edge, and, if applicable, delimit the receiving space. The cover layer and the support layer may in addition be connected along the inner peripheral edge of this additional through hole.

The cover layer and the support layer may be adjacently connected to each other along at least a part of the outer peripheral edge of the cover layer to enclose a receiving space extending along at least part of the first and second inner peripheral edges and being delimited by connections along the first and second inner and outer peripheral edges, wherein at least a part of the receiving space is filled with a filling material comprising an inorganic fibrous material, such that a raised portion with respect to at least the first outer peripheral edge of the cover layer is formed.

Preferably, the support layer and the cover layer are connected along the inner peripheral edge and the outer peripheral edge and form a receiving space between them. The receiving space is thus defined by the support layer, the cover layer and the inner and outer peripheral edge, respectively.

The receiving space may be at least partially filled with filling material, preferably the receiving space is substantially or fully filled with filling material. The rate of filling of the receiving space depends on the filling material used. Relatively smaller fibers, granules or other particles tend to fill smaller spaces better than relatively large fibers, granules or other particles. The filling material can be used in the form of a loose filling or wool that can be wadded or stuffed in the receiving space, or a felt, a paper, a granular material or a combination thereof. Alternatively, the filling material can be a layered material with a certain width and a height that leaves a part of the receiving space unfilled or empty, notably parts close to the inner and outer peripheral edge of the device. In addition, the unfilled spaces of the receiving space may be filled with filling material in another form, such as a loose filling material as described above.

According to a preferred embodiment, the filling material is formed as an insulating layer between the cover layer and the support layer that has a third outer and third inner peripheral edge, the insulating layer extending from the first inner peripheral edge of the cover layer to the first outer peripheral edge of the cover layer, and wherein the through hole is delimited by the first and third inner peripheral edges of the cover layer and the insulating layer, respectively. More preferably, the first and third peripheral edges extend over the second inner peripheral edge of the support layer, thereby forming a recess for accommodating at least part of the boiler burner, the recess extending from the second inner peripheral edge to the first and third inner peripheral edges, and wherein the layers are connected along at least part of the first outer peripheral edge of the cover layer and the second inner peripheral edge of the support layer.

An advantage is that when the insulating layer extends to the first inner peripheral edge thermal hot spots around the burner are prevented. For this purpose, the inner peripheral edge may also be covered with a heat resistant mantle, preferably comprising a heat resistant inorganic textile. Preferably, the connection between the cover layer, the layer of filling material and the support layer is such that a raised portion with respect to at least the outer peripheral edge of the cover layer is formed.

The raised portion filled with the filling material increases the thermal insulating properties of the device. Preferably, the raised portion is also formed with respect to the inner peripheral edge.

The amount of filling material, either inserted into the receiving portion or as a continuous layer, may depend on the desires insulation properties to achieve a required temperature at the surface of the cover plate, the so-called cold face temperature. Thus, the height of the raised portion or the thickness of the insulating layers used may depend on the desired insulating properties.

When the filling material is provided as a continuous insulating layer between the cover layer and the support layer, the cover layer, insulating layer and the support layer can be connected to each other along at least the first outer peripheral edge of the cover layer. In this way, the support layer and the cover layer can be different in size and still have a sufficient connection with each other. As such, a recess can be formed by providing the second inner peripheral edge of the support layer with larger width dimensions than the first and third inner peripheral edges, i.e. the through hole through the support layer is larger than the through hole through the cover layer and the insulating layer, respectively. When the respective through holes are aligned to each other, i.e. their centers coincide, the second inner peripheral edge of the support layer and the part of the support layer extending over the first and third inner peripheral edges form a recess for receiving a part of a boiler burner, for instance a connecting flange of the burner.

Preferably, the cover layer and the insulating layer are connected along at least part of the first and third peripheral edges. Moreover, at least the first and third outer peripheral edges may coincide, and the cover layer and the insulating layer may be connected along the coinciding outer peripheral edges.

It is preferred that the filling material or insulating layer comprises an inorganic fibrous material, such as an electronic grade glass fiber, also called e-grade glass fiber or e-glass, comprising alumino-borosilicate glass with less than 1% w/w alkali oxides, e.g. comprises at least one of aluminum oxide (Al2O3), silicon oxide (SiO2), calcium oxide (CaO) and magnesium oxide (MgO). Preferably, the inorganic fibrous material is soluble in water or a saline environment, preferably soluble in a human body, or biodegradable.

According to a preferred embodiment, a sealing element for sealing a burner housing of the boiler in use is provided along at least the outer peripheral edge of the support layer. The sealing element may be used to prevent any flue gasses to escape the burner and/or heat exchanger housing and to direct them towards the heat exchanger and/or a flue. Providing a sealing element to the outer peripheral edge of the support layer has the advantage of combining the burner cover insulation function of the burner stone from the prior art with the sealing function of the sealing gasket. Another advantage is that the sealing element at the outer peripheral edge of the support layer will be supported by the support layer as well.

According to another embodiment, the second outer peripheral edge of the support layer extends beyond at least part of the first outer peripheral edge of the cover layer, forming a radially extending flange.

An advantage of this embodiment is that the distance between the conventional burner stone and the sealing gasket is overcome and the sealing material can be provided along the outer peripheral edge of the extended support layer, i.e. the radially extending flange. This provides for a combination of the functions of the conventional burner stones and sealing gaskets in one device. This may be lead to efficiency in installing the device and/or in manufacturing and/or supply.

In the above embodiment, the support layer extends beyond the first outer peripheral edge of the cover layer. The first outer peripheral edge of the cover layer may then be connected to a support surface of the support layer, with or without the layer of filling material in between. For this embodiment, it is preferred that the sealing element is applied as a coating along the outer peripheral edge of the support layer covering the support layer over its full thickness, forming a single unit.

Alternatively, the sealing element is provided surrounding the outer peripheral edge of the support layer, wherein the sealing element is connected to the support layer along the second outer peripheral edge of the support layer and a fourth inner peripheral edge of the sealing element and forms a flange extending radially from the support layer.

In this embodiment, a separate sealing element is used for sealing the cover plate with respect to the burner housing. The separate sealing element is connected to the outer peripheral edge of the support layer, which may or may not already extend beyond the outer peripheral edge of the cover layer. Preferably, the first outer peripheral edge of the cover layer is connected to the outer peripheral edge of the support layer, with the insulating layer in between or adjacently.

The sealing element may comprise a material similar to that used for the support layer that is treated or processed with a material comprising a silicone rubber or graphite, such as impregnating, coating or laminating, or a combination thereof. The sealing material can cover both the outer peripheral edges of the support layer, the filling material and/or the cover layer. Preferably, the material is impregnated up to saturation with a silicone rubber or graphite, thereby forming a coating on the outside. Alternatively, the sealing element is formed from a solid material comprising graphite or a rubber material, such as a silicone rubber.

The through hole may be aligned with respect to the center of both the cover layer and the support layer. It is preferred that the inner peripheral edge and the outer peripheral edge are centered with respect to each other such that a distance between the outer and inner peripheral edge is the same along their periphery, i.e. that a width dimension of the cover layer extending from the inner peripheral edge to the outer peripheral edge of the cover layer is equal along the periphery. Preferably, the burner cover insulation device is substantially shaped as an annulus or annular ring having an outer and an inner diameter, wherein the inner diameter is defined by the through hole and the outer diameter is defined by the outer peripheral edge of the support layer. The above mentioned further through holes can be provided within the annular ring. Alternatively, the burner cover insulation device can have a different shape, such as a rectangle, triangle or other polygonal shape, preferably coinciding with the shape of the cover plate. The through hole can be substantially circular shaped, but can also be rectangular, triangular or other polygonal shape, preferably coinciding with the shape and dimensions of the burner of the boiler, such that the burner can be fittingly arranged in the through hole. It may be the case that the shape of the device and the shape of the through hole are coinciding.

According to a further embodiment, the raised portion described above forms at least a part of a raised annulus surrounding the through hole. It is preferred that the raised portion forms a raised annulus surrounding the through hole.

It is furthermore preferred that the respective layers, i.e. any combination of the cover layer, the insulating layer and/or the support layer, are connected through a mechanical connection by means of a connection element, preferably with sewing by stitching with a thread. Alternatively nails, staples or clamps, or any combination thereof, may be used.

Due to the high temperatures in the boiler, a mechanical connection between any combination of the support layer, the insulating layer and/or the cover layer is preferred. This mechanical connection can be done by clamping, nailing or stapling, but preferably by stitching with a thread. For the stitching, a metallic yarn comprising a non-metallic sheath can be used. Preferably, a metallic yarn comprising an iron alloy, such as a stainless steel, preferably with a cotton sheath, is used. The non-metallic sheath protects the stitching machines, or sewing machines, from the metallic yarn. The non-metallic sheath can comprise cotton, silk, wool, or a synthetic material like nylon or any other plastic material that is suitable for such application. Using only metallic yarn without a non-metallic sheath would lead to increased wear and subsequent failure of the sewing machines. Upon first use of the burner cover insulation device, the non-metallic or cotton sheath is burned away, leaving only the metallic yarn in the burner cover insulation device.

The mechanical connection can also be established by connecting a mantle to the inner peripheral edges of the cover layer and support layer, respectively. The mantle can be connected to the cover layer, the relatively hot side of the device during use, with a yarn comprising an inconel alloy. The mantle can be connected to the side of the support layer facing away from the cover layer, i.e. the 'cold' side during use of the device, by means of stitching or by means of an adhesive, such as a silicone based putty.

According to a further embodiment, a side of the support layer facing away from the cover layer comprises a protective layer to protect the support layer, such that the support layer is between the protective layer and the cover layer. The support layer is preferably made of a similar material as the filling material, i.e. an inorganic fibrous material in a woven or non-woven form. To shield the material of the support layer from the environment in the burner housing, a protective layer is applied to the side of the support layer facing away from the cover layer. The protective layer can comprise an inorganic textile, such as a mineral textile or an e-glass textile; an aluminum foil or coating; a polymer coating, such as a polyurethane coating; or a combination thereof.

The protective layer is provided to preserve the strength in the support layer during the high temperature cycles. For optimal use of the device according to the invention, the cover layer and the support layer, and any connecting element connecting these layers, retain their strength, independent of the presence of any binder materials, i.e. if binder materials are used, they will usually be burnt away after the first cycles of use. Preferably, the protective layer extends over the whole surface of the support layer, for instance in the case the support layer extends beyond the outer peripheral edge of the cover layer, the side of the extending part of the support layer, i.e. the outwardly extending flange, facing the cover layer is provided with a similar protective layer, for example comprising a polyurethane coating.

Additionally, the invention relates to a burner cover insulation assembly for shielding a burner cover from a boiler burner, the assembly comprising:
 a burner cover insulation device as described above, and
 a sealing body for sealing between the boiler burner and the burner cover, the sealing body comprising a through opening for receiving the boiler burner, the through opening having a fifth inner peripheral edge.

The burner cover insulation device is preferably used in a burner cover insulation assembly further comprising a sealing body or sealing gasket for sealing between the cover plate and the burner. The sealing body is used to seal the connection between a burner and the cover plate. The burner cover insulation device may be configured with a receiving recess as described above. The sealing body may be received in the recess of the burner cover insulation device, preferably together with a part of the burner that can extend through a through opening provided in the sealing body.

The recess and the sealing body may have complementary shapes to optimize sealing between the boiler burner and the burner cover. The outer dimensions of the sealing body and the inner dimensions of the recess, formed by the second inner peripheral edge of the support layer, are such that the outer edge of the sealing body is adjacent to the second inner peripheral edge of the support layer. The sealing body may be connectable to a connecting flange of the boiler burner and the sealing body and the connecting flange are together receivable in the recess of the device.

According to an embodiment, the sealing body and the recess comprise complementary positioning elements, such that upon receipt of the sealing body into the recess automatic positioning of the sealing body with respect to the device is achieved. To achieve this, the sealing body may comprise a transversely extending protrusion that is complementary to an indent transversely extending into the third peripheral edge, which protrusion and indent act as complementary positioning elements. By providing additional positioning means in the sealing body and the recess, the device can easily be aligned to the sealing body and thereby to the burner and the cover plate, such that other through holes used as look-through or access point are aligned as well.

The invention also relates to a boiler comprising:
 a burner,
 a burner housing accommodating the burner and a heat exchanger,
 a cover plate for covering the burner housing, and
 a burner cover insulation device as describe above for shielding the cover plate from the burner and heat exchanger, wherein the burner extends through the through hole of the burner cover insulation device into the burner housing, wherein the cover layer faces an interior of the burner housing and a side of the support layer facing away from the cover layer, faces the cover plate of the boiler.

According to an embodiment, the boiler comprises a burner cover insulation assembly for shielding the cover plate from the burner and heat exchanger, wherein the device comprises a recess for receiving part of the burner, wherein the burner extends through the through hole of the burner cover insulation device and through the further through hole of the sealing body into the burner housing, wherein the cover layer faces an interior of the burner housing and wherein a side of the support layer facing away from the cover layer and the sealing body face the cover plate of the boiler.

According to an embodiment, the second outer peripheral edge of the support layer is provided with a sealing material, such as a rubber material, such that the second outer peripheral edge of the support layer forms a sealing element between the burner housing and the cover plate. Depending of the embodiment of the device, the sealing material can be provided along any combination of outer peripheral edges, such as along the outer peripheral edge of the support layer alone, along the outer peripheral edge of the cover layer and the support layer, or along the outer peripheral edge of the cover layer, the layer of filling material and the support layer.

Preferably, the second outer peripheral edge of the support layer extends beyond at least part of the first outer peripheral edge of the cover layer, forming a radially extending flange.

A sealing element for sealing between the burner housing and the cover plate may be provided, the sealing element surrounding the second outer peripheral edge of the support layer, wherein the sealing element is connected to the support layer along the second outer peripheral edge of the support layer and a fourth inner peripheral edge of the sealing element, thereby forming a flange extending radially from the support layer.

The sealing element may be a solid rubber element that is integrally connected to the support layer. Alternatively, the sealing element may comprise an inorganic fibrous material, similar to the material of the insulating layer that is impregnated with a silicone rubber, preferably up to saturation of the fibrous material.

Preferably, a side of the support layer facing away from the cover layer comprises a protective layer to protect the support layer from an interior environment of the boiler, wherein the protective layer faces the cover plate.

The invention furthermore relates to a method for manufacturing a burner cover insulation device as described above, the method comprising:
  providing a cover layer having a first outer peripheral edge and a support layer having a second outer peripheral edge, wherein the cover layer comprises a heat resistant inorganic fibrous material;
  providing a filling material, forming an insulating layer, between the support layer and the cover layer;
  cutting a through hole through at least the support layer and the cover layer, thereby forming a first inner peripheral edge of the cover layer and a second inner peripheral edge of the support layer; and
  connecting the cover layer and the support layer along at least a part of the first outer peripheral edge of the cover layer and at least part of the second inner peripheral edge of the support layer.

According to an embodiment, the through hole is delimited by the first and second inner peripheral edges of the cover layer and the support layer, respectively, and the method further comprises connecting the cover layer and the support layer along at least part of the first inner peripheral edge.

A receiving space may be formed between the support layer and the cover layer after connecting the cover layer along at least a part of its outer peripheral edge and/or its inner peripheral edge to the support layer, and the filling material is provided within at least part of the receiving space to form a raised portion with respect to the inner peripheral edge.

The method may comprise that after connecting the cover layer along at least a part of its outer peripheral edge and/or its inner peripheral edge to the support layer, a filling opening between the support layer and the cover layer is provided on at least one of the outer and inner peripheral edge and the method further comprises filling at least part of the receiving space with the filling material such that the raised portion with respect to the outer peripheral edge of the cover layer is formed, and closing the filling opening after filling the receiving opening by connecting the cover layer and the support layer at the filling opening. The filling opening can be provided with a valve to allow filling material to enter the receiving space. Preferably, the valve is a one-way valve to prevent the filling material to escape the filling material after filling. The valve can be removed upon closing the filling opening during the manufacturing process.

Providing the filling material between the support layer and the cover layer may also comprise providing a layer of filling material between the support layer and the cover layer before the steps of connecting the cover layer along at least a part of its outer peripheral edge and/or its inner peripheral edge to the support layer. Alternatively, the method comprise before providing a filling material between the support layer and the cover layer, but after connecting the cover layer along at least a part of its outer peripheral edge and/or its inner peripheral edge to the support layer, the step of placing the device into a mold such that upon filling the receiving space with filling material, the raised portion assumes the shape of the mold. In this way, any desired shape of the raised portion can be formed.

According to a preferred embodiment, the method comprises:
  providing the filling material as an insulating layer having a third outer peripheral edge; and wherein the step of cutting a through hole through at least the support layer and the cover layer comprises:
  cutting a through hole through the insulating layer, thereby forming a third inner peripheral edge in the insulating layer, wherein the through hole delimited by the second inner peripheral edge of the support layer has larger width dimensions than the through hole delimited by the first and third inner peripheral edges of the cover layer and insulating layer, respectively;
  connecting the cover layer along its outer peripheral edge and its inner peripheral edge to the insulating layer, thus forming a combined layer; and
  connecting the combined layer to the support layer along the second inner peripheral edge of the support layer and the first outer peripheral edge of the cover layer, such that the first and third peripheral edges extend over the second inner peripheral edge of the support layer, thereby forming a recess for accommodating at least part of the boiler burner, the recess extending from the second inner peripheral edge of the support layer to the first and third inner peripheral edges of the cover layer and the insulating layer, respectively.

By following these method steps, a device with a recess for receiving a part of a burner, such as a burner flange, is obtained.

According to a further embodiment, the method comprises providing at least the second outer peripheral edge of the support layer with a sealing material, comprising for example a rubber material, e.g. a silicone rubber, or graphite, such that the outer peripheral edge of the support layer forms a sealing element for sealing the connection of the burner cover plate to the burner housing of the boiler in use. The sealing material can cover both the outer peripheral edges of the support layer, the filling material and/or the cover layer.

Alternatively, the sealing element is formed from a solid material comprising graphite or a rubber material, such as a silicone rubber. The method may thus comprise:
- providing a sealing element enclosing the support layer, the sealing element having a fourth inner peripheral edge with complementary dimensions to the second outer peripheral edge of the support layer;
- connecting the sealing element and the support layer along the fourth inner peripheral edge and the second outer peripheral edge, thereby forming a flange extending radially from the support layer.

The sealing element may be a separate element that is connected to the support layer, preferably before the cover layer and insulating layer are connected to the support layer. The connection between the sealing element and the support layer is preferably established by means of a mechanical connection with a connection element, such as stitching with a thread. Preferably, the sealing element comprises a material similar to that used for the support layer that is treated or processed, e.g. by impregnating, coating or laminating, or a combination thereof, with a material comprising a rubber material, e.g. a silicone rubber, or graphite. Preferably, the material is impregnated up to saturation with a silicone rubber or graphite, thereby forming a coating on the outside.

The method may also comprise:
- providing a sealing body for sealing between the boiler burner and the cover plate,
- cutting a through opening in the sealing body such that the boiler burner is extendable through the sealing body.

Preferably, the sealing body is receivable in the recess of the burner cover insulation device.

These steps are concerned with manufacturing the burner cover insulation assembly comprising the burner cover insulation device and the sealing body as described above.

BRIEF DESCRIPTION OF THE DRAWINGS

The features and advantages of the invention will be further appreciated upon reference to the following drawings of a number of exemplary embodiments, in which.

DESCRIPTION OF ILLUSTRATIVE EMBODIMENTS

Figure 1:
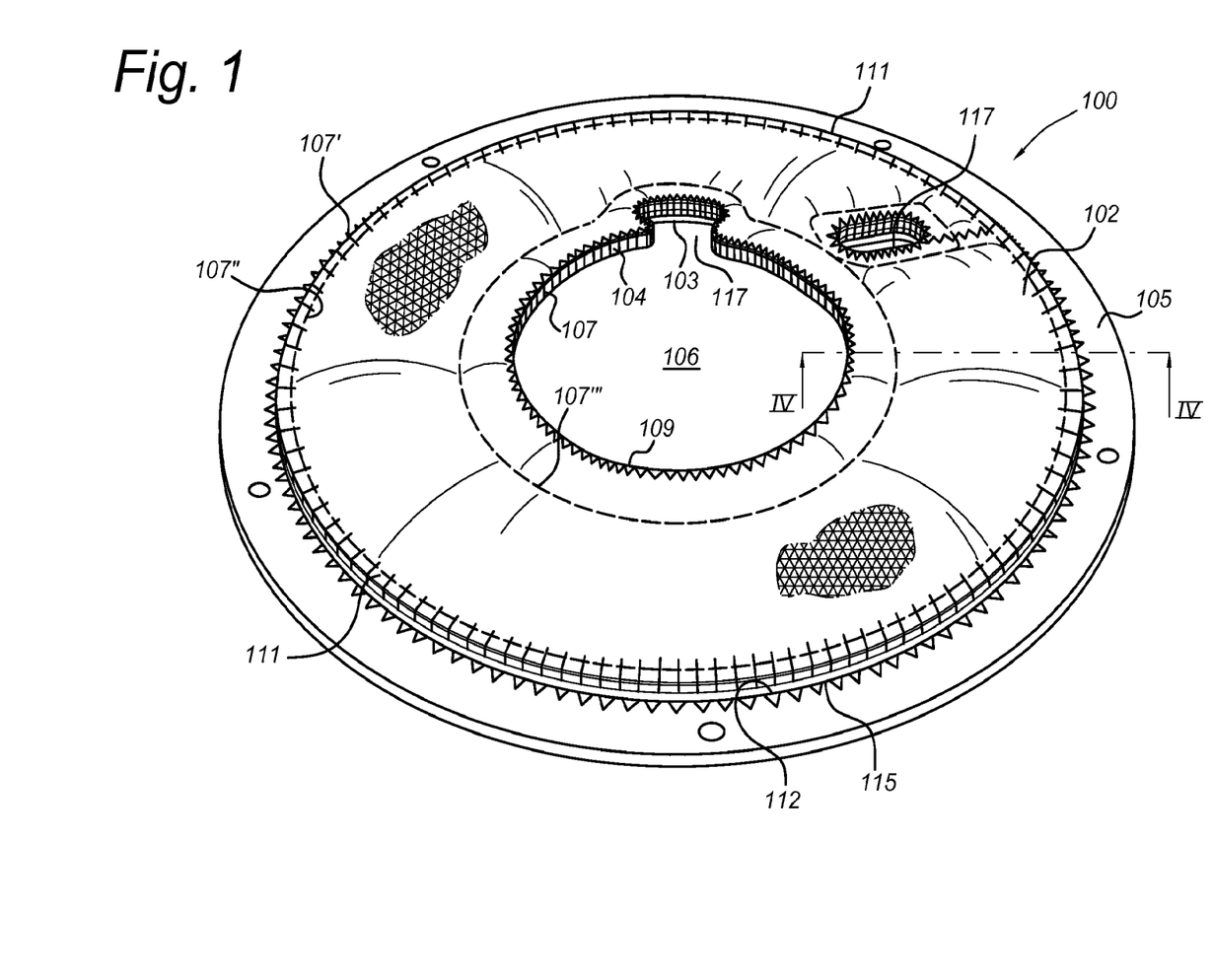
FIG. 1 shows a perspective view of an upper side a first embodiment of the burner cover insulation device according to the invention.
Figure 2:
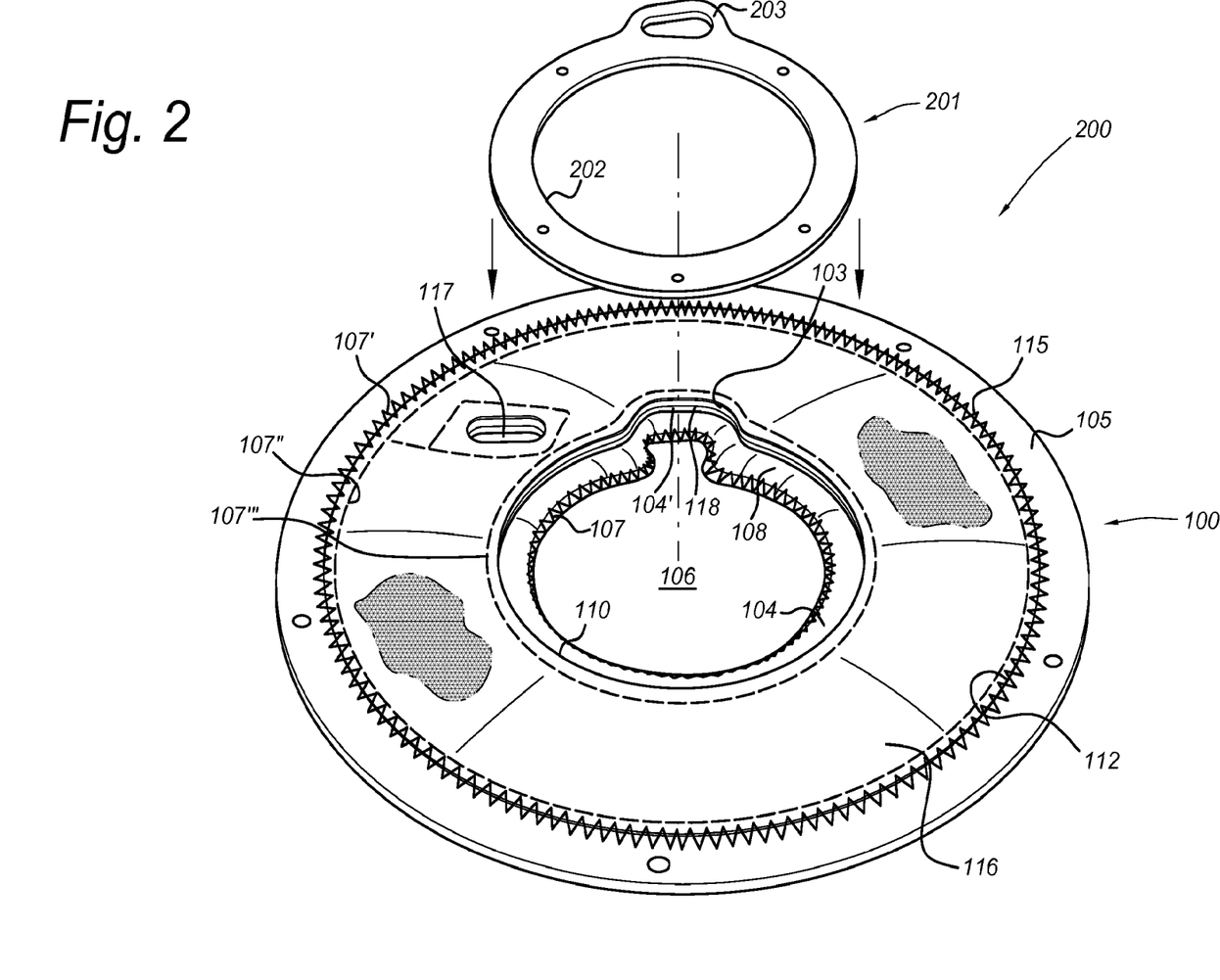
FIG. 2 shows an exploded view of a burner cover insulation assembly comprising the burner cover insulation device of FIG. 1.

FIG. 1 shows a perspective view of an upper side a first embodiment of the burner cover insulation device 100. The burner cover insulation device 100 comprises a cover layer 102 and a support layer 103. In between the cover layer 102 and the support layer 103, the insulating layers 104, 104', also shown in FIG. 2, is provided. Surrounding the support layer 103 is a sealing element 105 formed as a flange radially extending from the support layer 103. The sealing element 105 is formed as a separate ring shaped body having a fourth inner peripheral edge 115 with similar dimensions as the second outer peripheral edge 112 of the support layer 103. The sealing element 105 adjacently encloses the support layer 103 and is connected to the support layer 103 by means of stitching 107'.

Figure 3:
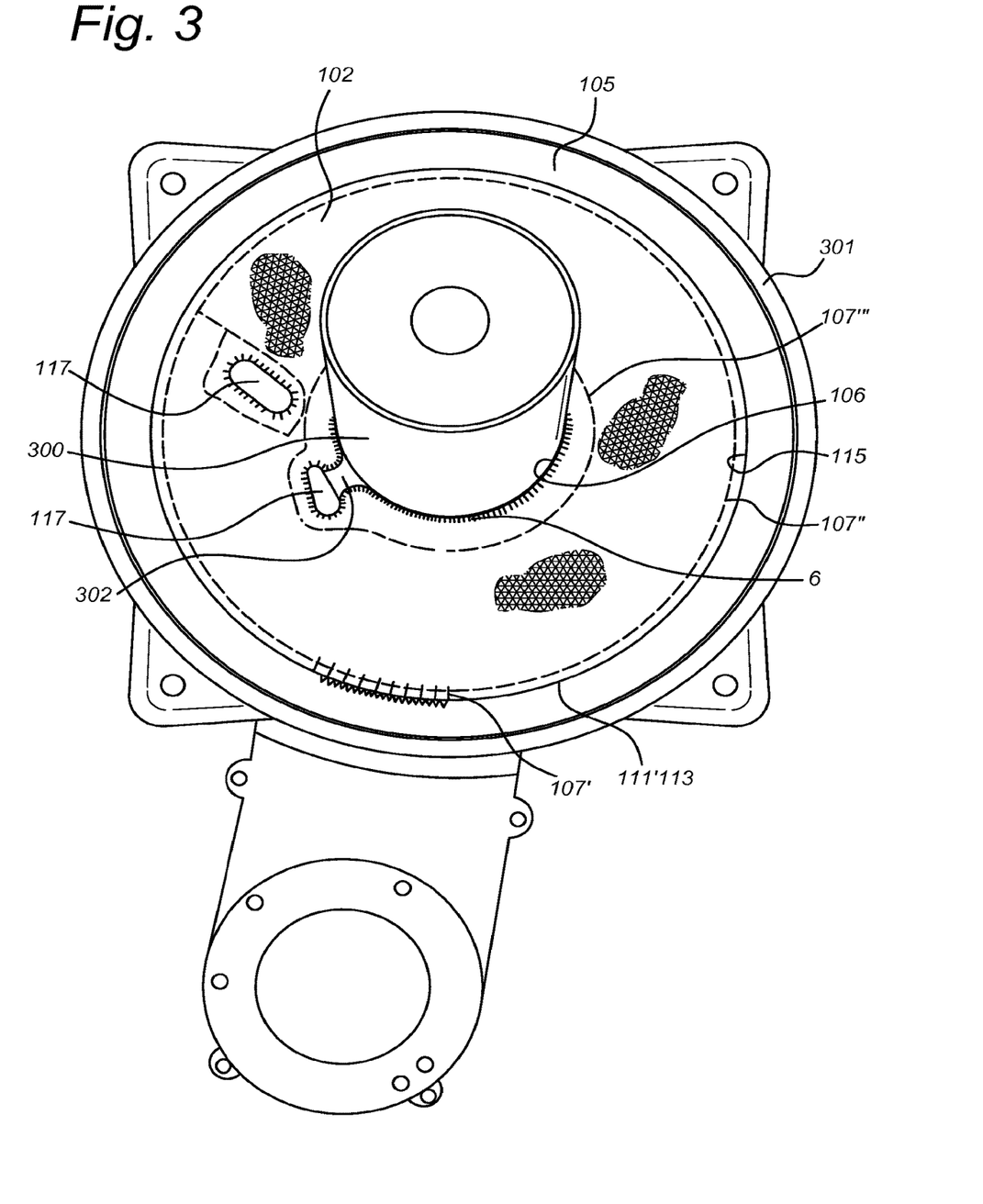
FIG. 3 shows a perspective view of the burner cover insulation assembly of FIG. 2 arranged around a boiler burner.

A through hole 106 extends through the cover layer 102 and the support layer 103 to accommodate a burner 300, as shown in FIG. 3. The through hole 106 is delimited by a first inner peripheral edge 109 of the cover layer 102 and a third inner peripheral edge 113 of the insulating layer 104. The first and second outer peripheral edges 111, 112 coincide in this embodiment of the device 100.

FIG. 2 shows an exploded view of an embodiment of the burner cover insulation assembly comprising the burner cover insulation device 100 of FIG. 1 and a sealing body 201. The burner cover insulation device 100 is shown with the cover layer 102 facing away from the viewer. The device 100 further comprises a protective layer 116 covering the support layer 103 for protection against the environment in the burner and heat exchanger housing 400 and for providing mechanical strength and a clean finish. As shown in FIG. 2, the support layer 103 has a second inner peripheral edge 110 that has a wider diameter than the first inner peripheral edge 109 of the cover layer 102 and the third inner peripheral edge 113 of the insulating layer 104. The cover layer 102 and the insulating layer 104 thus extend over the support layer 103 into the through hole 106. A receiving recess 108 is thus formed, wherein the sealing body 201 and the burner flange 302 can be accommodated, see FIGS. 3 and 6. The recess 108 and the sealing body 201 have complementary shapes to optimize sealing between the boiler burner and the burner cover. Additionally, the sealing body 201 comprises a transversely extending protrusion 203 that is complementary to an indent 118 transversely extending into the first and third inner peripheral edges 109, 113. The protrusion 203 of the sealing body 201 and the indent 118 of the device 100 act as complementary positioning elements to position the sealing body 201 and the device 100 with respect to each other upon installation in a boiler. The sealing body 201 is connectable to a connecting flange 302 of the boiler burner 300. The sealing body 201 and the connecting flange 302 are together receivable in the recess 108 of the device 100.

In addition to the through hole 106, a further through hole 117 is provided that extends through the cover layer 102 and the support layer 103. The further through hole 117 can be used to uncover the looking glass of the boiler to check whether the burner is still working, or can be used to accommodate any fastening means through the device, such as bolts and/or screws.

The further through hole 117 is defined by a further inner peripheral edge of the cover layer 102 and the support layer 103, respectively. The cover layer 102 and the support layer 103 are also connected along these respective inner peripheral edges.

The mechanical connection by means of the stitches 107, 107', 107", 107''' secures the various parts of the device 100 to each other even under the harsh environment of a boiler. Stitching 107 mechanically connects the cover layer 102 and the insulating layer 104 along the first and third inner peripheral edges 109, 113 of the cover layer 102 and insulating layer 104, respectively. Stitching 107' mechanically connects the support layer 103 and the sealing element 105. Preferably, stitching 107 and 107' are zigzag stitches, but any other stitches having a radial or transverse component may be suitable for connecting in a radial direction or to lock in the material at the peripheries. Stitching 107" and 107''' connect the support layer 103, insulating layer 104 and cover layer 102 along the respective outer peripheral edge and the third inner peripheral edge 113 of the support layer 103.

Upon manufacturing, each layer is first cut out from a sheath or roll of material, including the sealing element 105, thereby forming both the inner and the outer peripheral edges and the further through holes 117. To form the embodiment of FIGS. 1 and 2, protective layer 116, support layer 103, further insulating layer 104' and sealing element 105 are connected by zigzag stitches 107'.

Then insulating layer 104 and cover layer 102 are connected along their respective coinciding inner and outer peripheral edges by zigzag stitches 107.

The combined and connected cover layer and insulating layer are subsequently placed on the support layer 103, thereby aligning the outer peripheral edges of the cover layer and the support layer and the further through holes 117. All layers are connected to each other along the outer peripheral edge 112 of the support layer with plane through stitches 107", and the inner peripheral edge 110 of the support layer with plane through stitches 107''' to form the device 100.

For the stitches 107, 107', 107", 107''' a metal yarn, preferably comprising an iron alloy, covered with a non-metallic coating or sheath, preferably a cotton sheath, can be used. The cotton sheath will be burned upon the first use of the burner cover insulation device in a boiler. The iron alloy yarn will remain to connect the various parts to form the device 100.

FIG. 3 shows perspective view of the burner cover insulation assembly 200 of FIGS. 1 and 2 arranged around a burner 300 of a boiler (not shown). The device 100 is provided over the burner 300, such that the burner 300 extends through the through hole 106 of the device 100 and the sealing body 201. The shape of the through hole 106 is such that the burner 300 is enclosed by the inner peripheral edges of the burner cover insulation device, see FIG. 5. In the embodiment shown in FIGS. 1-3, the partitioning between the through hole 106 and a further though hole 117 is omitted, purely for manufacturing reasons. For the embodiment of FIG. 5, the through hole can be such that the burner is fully enclosed, i.e. around its complete circumference, and the further through hole 117 is formed in the device 100 at a distance different from zero from the through hole 106.

The protective layer 116 (not shown) faces the cover plate 301 and the cover layer 102 is facing the interior of the burner housing 401 (not shown). The sealing element 105 provided along the second outer peripheral edge 112 of the support layer 103 seals the cover plate 301 and the heat exchanger housing 401 during use. The sealing body 201 is provided underneath the burner flange 302 and can thus not be seen in FIG. 3. The sealing body 201 and the burner flange 302 are both received and accommodated within the receiving recess 108 of the device 100.

Figure 4:
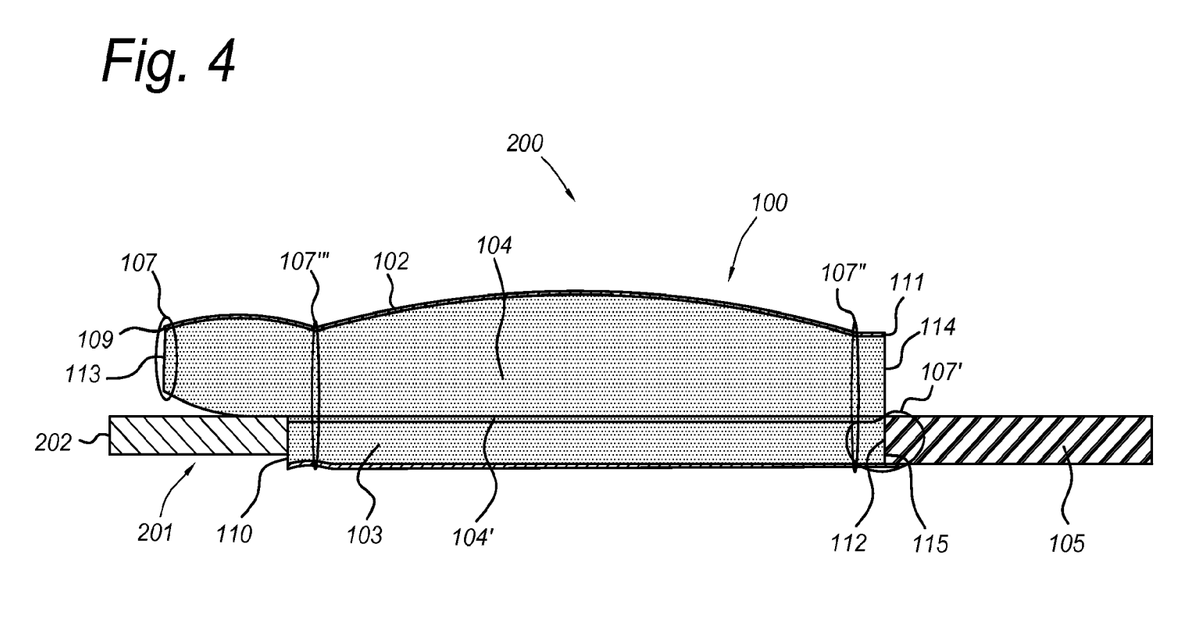
FIG. 4 shows a cross section of the burner cover insulation assembly comprising the burner cover insulation device of FIG. 1 along line IV-IV in FIGS. 1 and 2.

FIG. 4 shows a cross section of the burner cover insulation assembly 200 comprising the burner cover insulation device 100 of FIG. 1 along line IV-IV. The cover layer 102 is formed from a woven silica textile that can withstand elevated temperatures. The silica textile may be provided with a coating to reduce the permeability of the textile.

The support layer 103 is provided with a protection layer 116. The protective layer 116 can comprise an aluminum alloy foil or a woven textile comprising an inorganic fibrous material, such as glass fiber or a coated e-glass textile. The woven textile may be coated with a polyurethane coating to increase the high temperature resistance of the protective layer 116. The protection layer 116 protects the fibers in the support layer 103 and locks them in the device 100. The support layer 103 further comprises at least one layer of e-glass paper, i.e. electronic grade glass paper or a felt made of e-glass fibers. Using several layers in the support layer results in an increase rigidity of the support layer and therefore provides an increased support and mechanical strength for the device 100 and improves the moisture resistance of the device simultaneously.

The filling material comprises several layers of an insulating material 104, 104', such as a felt or a paper comprising an inorganic fibrous material that is soluble in a hydrous or saline environment. This has the advantage that the fibers of the insulating material can be dissolved when in the human body and is therefore not seen as a health risk for any users compared to other inorganic fibers, e.g. asbestos. Preferably, the filling material comprises at least one of aluminum oxide ($Al2O3$), silicon oxide ($SiO2$), calcium oxide (CaO) and magnesium oxide (MgO). FIG. 2 shows the use of a first insulating layer 104 and an additional insulating layer 104'. Using several layers of insulating material increases the insulation capacity of the device 100 and such gives the device 100 increased heat shielding properties. The additional insulating layer has an inner peripheral edge 113' coinciding with the inner peripheral edge 110 of the support layer 103.

Figure 5:
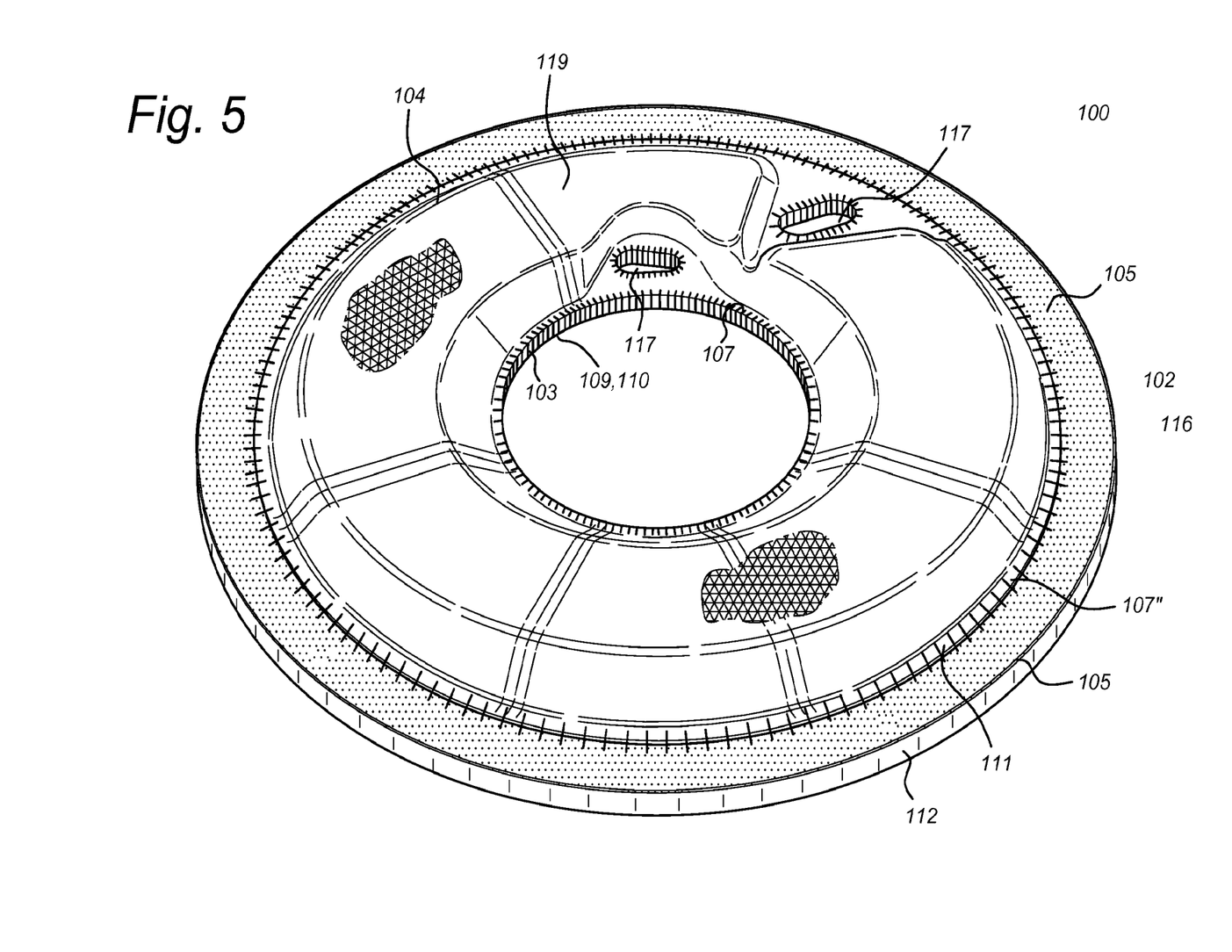
FIG. 5 shows a perspective views of a second embodiment of the burner cover insulation device according to the invention.

FIG. 5 shows a perspective views of a second embodiment of the burner cover insulation device 100 according to the invention. In this embodiment, the cover layer 102 and the support layer 103 define a receiving space in which the insulating layer 104 is provided. The receiving space with the insulating layer 104 forms a raised portion 119 with respect to the respective inner and outer peripheral edges. The through hole 106 is centered with respect to the raised portion 119, or at least with respect to the first outer peripheral edge 111 of the cover layer 102. In this embodiment, the outer peripheral edge 112 of the support layer 103 extends beyond the outer peripheral edge 111 of the cover layer 102, thereby forming a radially outwardly extending flange acting as the sealing element 105. Along the outer peripheral edge 112 of the support layer 104. The sealing element 105 comprises a silicone rubber that is impregnated into the material of the support layer 103 up to saturation, thereby forming a rubbery outer layer forming the sealing element 105. This embodiment may or may not be provided with a receiving recess 108 as shown in the embodiment of FIGS. 1 and 2. Without the receiving recess 108, the inner peripheral edges 109, 110 of the support layer 103 and the cover layer 102 coincide and the sealing body 108 may be omitted upon installation of the device 100 in a boiler.

Figure 6:
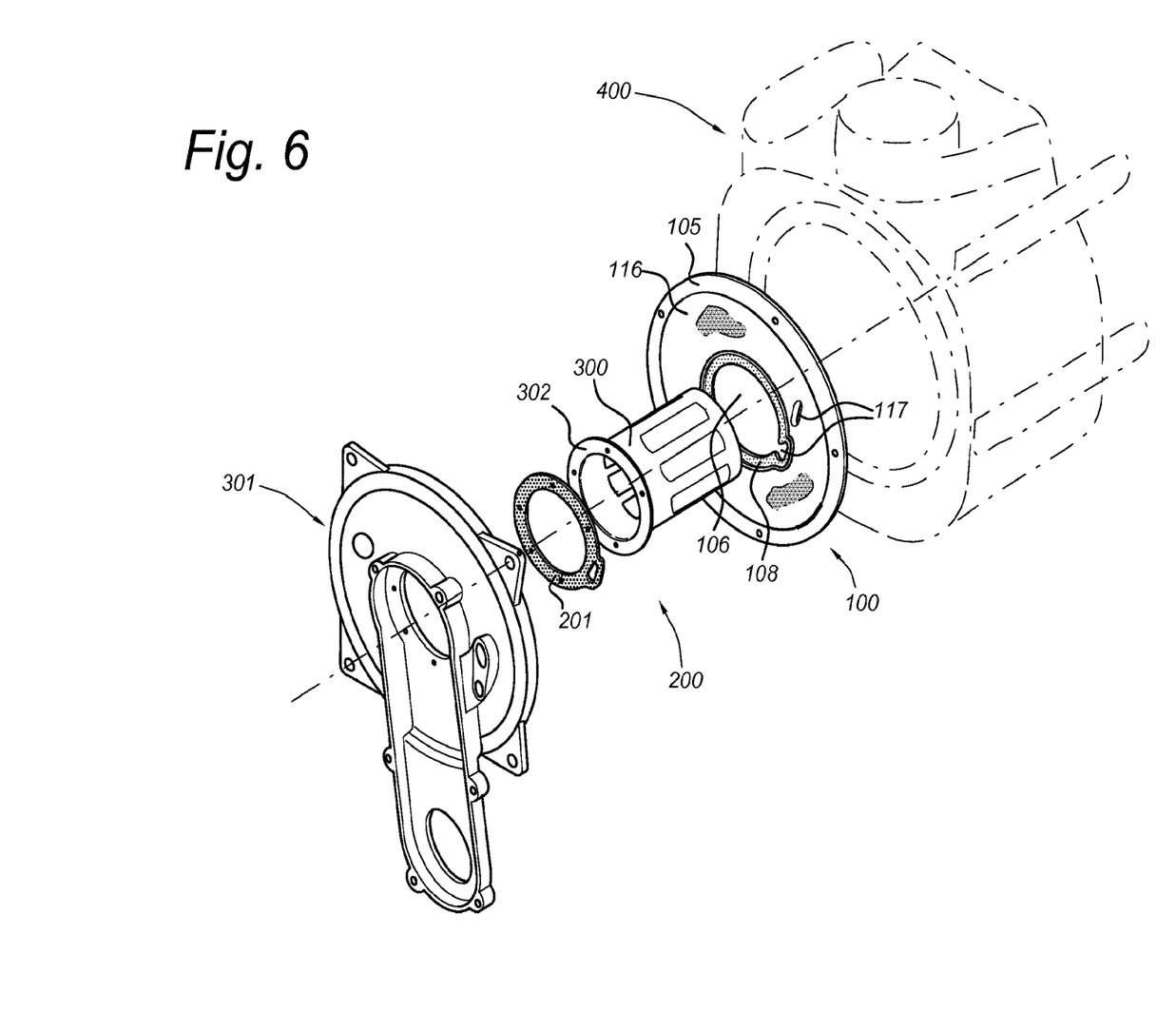
FIG. 6 shows an exploded view of a burner cover insulation assembly comprising the burner cover insulation device of FIG. 2.

FIG. 6 shows an exploded view of a burner 300 comprising the burner cover insulation assembly 200 of FIG. 2. The burner cover insulation device 100 is used to protect the cover plate 301 when covering the burner housing 400 (dashed) in which the heat exchanger (not shown) and the burner 300 are provided. The burner 300 extends through the through hole 106 of the burner cover insulation device 100 and the sealing body 201. The sealing body 201 or gasket is provided in between the burner flange 302 and the cover plate 301. In use the burner flange 302 is connected to the cover plate by means of bolts or the like. The burner cover insulation device 100 is provided at an opposite side of the burner flange 302, such that the protective layer 116 faces the cover plate 301. The cover layer 102 faces the interior of the burner housing 400 to shield the cover plate 301 from the heat produced by the burner 300. The sealing element 105 is formed as a radially outwardly extending flange and forms a gasket element sealing the burner housing 400 in use to prevent any flue gasses to escape the burner housing 400 other than via a flue (not shown). The sealing element 105 may be provided with through holes for accommodating bolts or other suitable fastening means that may be used to fasten the cover plate 301 through the burner cover insulation device 100 to the burner housing 400 and/or heat exchanger (not shown).

In other embodiments (not shown), the burner cover insulation device 100 may be located between the cover plate 301 and the burner 300, such that the burner flange 302 is adjacent to the cover layer 102. The through hole 106 then provides an opening to the burner 300 for receipt of other burner elements (not shown).

Thus, the invention has been described by reference to certain embodiments discussed above. It will be recognized that many modifications in addition to those described above may be made to the structures and techniques described herein without departing from the spirit and scope of the invention. Accordingly, although specific embodiments have been described, these are examples only and are not limiting upon the scope of the invention.

LIST OF REFERENCE SYMBOLS

- 100 burner cover insulation device
- 102 cover layer
- 103 support layer
- 104, 104' insulating layer
- 105 sealing element
- 106 through hole
- 107, 107', 107", 107''' stitching
- 108 receiving recess
- 109 first inner peripheral edge of cover layer
- 110 second inner peripheral edge of support layer
- 111 first outer peripheral edge of cover layer
- 112 second outer peripheral edge of support layer
- 113 third inner peripheral edge of insulating layer
- 114 third outer peripheral edge of insulating layer
- 115 fourth inner peripheral edge of sealing element
- 116 protective layer
- 117 further through hole
- 118 indent
- 119 raised portion
- 200 burner cover insulation assembly
- 201 sealing body
- 202 fifth inner peripheral edge of sealing body
- 203 protrusion
- 300 burner
- 301 cover plate
- 302 burner flange
- 400 burner and heat exchanger housing

What is claimed is:

1. An insulation device for shielding a cover plate of a burner housing from heat produced by a boiler burner inside the burner housing, wherein the cover plate seals an access opening provided in the burner housing and the boiler burner protrudes inside the burner housing, the insulation device forming a unit that is separate from the cover plate and comprising:
    a cover layer comprising a flexible layer of heat resistant inorganic fibers and having a first outer peripheral edge;
    a support layer providing mechanical strength to the device and having a second outer peripheral edge that at least extends to the outer peripheral edge of the cover layer, and
    a filling material forming an insulating layer between the cover layer and the support layer;
    wherein a through hole extends through the cover layer and the support layer thereby forming a first inner peripheral edge of the cover layer and a second inner peripheral edge of the support layer, wherein the through hole is at least delimited by the first inner peripheral edge of the cover layer, and wherein the cover layer and the support layer are connected along at least part of the first outer peripheral edge of the cover layer and at least part of the second inner peripheral edge of the support layer,
    wherein the insulating layer, located between the cover layer and the support layer, has a third outer and a third inner peripheral edge, the insulating layer extending from the first inner peripheral edge of the cover layer to the first outer peripheral edge of the cover layer, and wherein the through hole is delimited by the first and third inner peripheral edges of the cover layer and the insulating layer, respectively, and
    wherein the first and third inner peripheral edges extend over the second inner peripheral edge of the support layer, thereby forming a recess for accommodating at least part of the boiler burner, the recess extending from the second inner peripheral edge to the first inner peripheral edge, and wherein the layers are connected along at least part of the first outer peripheral edge of the cover layer and the second inner peripheral edge of the support layer.

2. The insulation device according to claim 1, wherein the through hole is delimited by the first and second inner peripheral edges of the cover layer and the support layer, respectively, and wherein the cover layer and the support layer are connected along at least part of the first and second inner peripheral edges.

3. The insulation device according to claim 1, wherein the cover layer and the support layer are mechanically interconnected by stitches, staples, or nails.

4. The insulation device according to claim 3, wherein the cover layer and the support layer are connected through stitching, using a metallic yarn comprising a non-metallic sheath.

5. The insulation device according to claim 1, further comprising a sealing element, defining a fourth inner peripheral edge surrounding the second outer peripheral edge of the support layer, and connected with the fourth inner peripheral edge to the support layer along the second outer peripheral edge thereof by stitches or staples, the sealing element forming a flange extending radially from the support layer.

6. The insulation device according to claim 1, wherein the second outer peripheral edge of the support layer extends beyond at least part of the first outer peripheral edge of the cover layer forming a radially extending flange, the second outer peripheral edge being provided with a sealing material such that the outer peripheral edge of the support layer forms a sealing element for sealing the burner housing.

7. The insulation device according to claim 1, wherein a side of the support layer facing away from the cover layer comprises a protective layer to protect the support layer.

8. The insulation device according to claim 1, wherein the flexible layer of heat resistant inorganic fibers of the cover layer is a woven textile layer.

9. The insulation device according to claim 8, wherein the woven textile layer is a woven silica textile provided with a heat resistant coating on at least a side facing away from the filling material.

10. The insulation device according to claim 1, wherein the insulating layer comprises an inorganic fibrous material that is soluble in water or in a saline environment.

11. An insulation assembly for shielding a cover plate of a burner housing from heat produced by a boiler burner inside the burner housing, wherein the cover plate seals an access opening provided in the burner housing and the boiler burner protrudes inside the burner housing, the assembly comprising:
 the insulation device of claim 1, and
 a sealing body for sealing between the boiler burner and the cover plate, the sealing body comprising a through opening for receiving the boiler burner, the through opening having a fifth inner peripheral edge.

12. The insulation assembly according to claim 11, wherein the insulation device defines a recess for accommodating at least part of the boiler burner, said recess extending from the second inner peripheral edge of the support layer to the third inner peripheral edge of the insulating layer, wherein the cover layer and the support layer are connected along at least part of the first outer peripheral edge of the cover layer and the second inner peripheral edge of the support layer, and wherein the sealing body is receivable in the recess of the insulation device.

13. A boiler comprising:
 a burner;
 a burner housing, accommodating the burner and a heat exchanger;
 a cover plate adapted to cover and seal an access opening provided in the burner housing, and
 the insulation device of claim 1, wherein the burner extends through the through hole of the insulation device into the burner housing, wherein the cover layer faces an interior of the burner housing and a side of the support layer facing away from the cover layer, faces the cover plate.

14. A method for manufacturing the insulation device of claim 1, the method comprising:
 providing a cover layer having a first outer peripheral edge and a support layer having a second outer peripheral edge, wherein the cover layer comprises a flexible layer of heat resistant inorganic fibers;
 providing a filling material, forming an insulating layer, between the support layer and the cover layer;
 cutting a through hole through the support layer, the insulating layer, and the cover layer, thereby forming a first inner peripheral edge of the cover layer and a second inner peripheral edge of the support layer;
 connecting the cover layer and the support layer along at least a part of the first outer peripheral edge of the cover layer and at least part of the second inner peripheral edge of the support layer, and
 providing the filling material as an insulating layer having a third outer peripheral edge;
 wherein the cutting step comprises:
  cutting a through hole through the insulating layer, thereby forming a third inner peripheral edge in the insulating layer, wherein the through hole delimited by the second inner peripheral edge of the support layer has larger width dimensions than the through hole delimited by the first and third inner peripheral edges of the cover layer and the insulating layer, respectively;
  connecting the cover layer along its outer peripheral edge and its inner peripheral edge to the insulating layer, thus forming a combined layer, and
  connecting the combined layer to the support layer along the second inner peripheral edge of the support layer and the first outer peripheral edge of the cover layer, such that the first and third inner peripheral edges extend over the second inner peripheral edge of the support layer, thereby forming a recess for accommodating at least part of the boiler burner, the recess extending from the second inner peripheral edge of the support layer to the first and third inner peripheral edges of the cover layer and the insulating layer, respectively.

15. The method according to claim 14, further comprising:
 mechanically connecting the cover layer along its outer peripheral edge and its inner peripheral edge to the insulating layer by using stitches, staples, or nails, thus forming a combined layer; and
 mechanically connecting the combined layer to the support layer along the second inner peripheral edge of the support layer and the first outer peripheral edge of the cover layer by using further stitches, staples, or nails.

16. The method according to claim 14, further comprising:
 providing a sealing element enclosing the support layer, the sealing element having a fourth inner peripheral edge with complementary dimensions to the second outer peripheral edge of the support layer, and
 connecting the sealing element and the support layer along the fourth inner peripheral edge and the second outer peripheral edge, thereby forming a flange extending radially from the support layer.

17. The method according to claim 14, further comprising:
 providing a sealing body for sealing between the boiler burner and the cover plate, wherein the sealing body is receivable in the recess of the insulation device, and
 cutting a through opening in the sealing body such that the boiler burner is extendable through the sealing body.

* * * * *